United States Patent [19]

Yoshida

[11] 4,082,894

[45] Apr. 4, 1978

[54] POLYCARBONATE RESIN SHAPED ARTICLES HAVING IMPROVED ABRASION RESISTANCE

[75] Inventor: Motoaki Yoshida, Takarazuka, Japan

[73] Assignee: Nippon Sheet Glass Co., Ltd., Osaka, Japan

[21] Appl. No.: 670,867

[22] Filed: Mar. 26, 1976

[30] Foreign Application Priority Data

Mar. 26, 1975 Japan .................................. 50-37237

[51] Int. Cl.$^2$ .......................... B05D 1/38; B05D 7/02; B32B 27/08
[52] U.S. Cl. ..................................... 428/335; 427/164; 427/379; 428/336; 428/412
[58] Field of Search ................ 427/379, 164; 428/336, 428/412, 335

[56] References Cited

U.S. PATENT DOCUMENTS 3,762,940  10/1973  Bechtold ............................... 428/412

Primary Examiner—James R. Hoffman
Attorney, Agent, or Firm—Wenderoth, Lind & Ponack

[57] ABSTRACT

A polycarbonate resin shaped article having a cured coating of a melamine-type resin on its surface through a primer layer resulting from the solidification or curing, in the presence or absence of a crosslinking agent and a crosslinking catalyst, of a primer comprising a polymer containing a carboxyl or carbamoyl group or a polymer containing a hydroxyl and carboxyl, amino, substituted amino, epoxy or tetrahydrofuryl group; a primer coating composition useful for the surface treatment of the above shaped article; and a method for producing the coated polycarbonate resin shaped article.

14 Claims, No Drawings

POLYCARBONATE RESIN SHAPED ARTICLES HAVING IMPROVED ABRASION RESISTANCE

This invention relates to the surface-treatment of a shaped article of a polycarbonate resin, and more specifically, it relates to a polycarbonate resin shaped article having a cured and rigidly bonded coating of a melamine-type resin paint with superior abrasion resistance and solvent resistance, a primer coating composition useful for the surface treatment of the above shaped article, and a method for producing the coated polycarbonate resin shaped article.

Generally, shaped articles of polycarbonate-type synthetic resins have superior impact strength, but since their physical and chemical properties such as abrasion resistance or solvent resistance are poor, they are susceptible to surface injury and to attack by organic solvents. In an attempt to remedy this defect, suggestions have heretofore been made to coat the surface of a polycarbonate resin shaped article with various thermosetting resins having good abrasion resistance or solvent resistance. Curable surface treating agents for polycarbonate resin shaped articles, which are now in common use for this purpose, include, for example, melamine resins, heat-curable acrylate resins, polyester resins, polyurethane resins, and organopolysiloxanes. These resins, however, do not lend themselves to sufficient adhesion to polycarbonate resin substrates, and therefore, polycarbonate resin shaped articles coated with these treating agents are unsatisfactory with regard to durability (see, for example, SPE J., 27 [9], 8 1971, and U.S. Pat. Nos. 3,451,183 and 3,554,698).

It is an object of this invention to provide a polycarbonate resin shaped article having improved durability in which a cured coating of a melamine-type resin paint having superior abrasion resistance and solvent resistance is adhered firmly to the surface of the article.

Another object of this invention is to provde a primer coating composition useful for coating a melamine-type resin paint having superior abrasion resistance and solvent resistance on the surface of a polycarbonate resin shaped article.

Still another object of this invention is to provide a process for producing a shaped article of a polycarbonate resin having a melamine-type resin coating and possessing abrasion resistance, solvent resistance and durability.

Other objects, features and advantages of this invention will become apparent to those skilled in the art from the following description.

The fundamental principle of the present invention is that a primer layer of a substance having good adhesion both to a polycarbonate-type resin and a melamine-type resin is interposed between a shaped article of the polycarbonate-type resin and a coating of the melamine-type resin formed on its surface, thereby increasing the adhesion of the melamine-type resin coating to the polycarbonate resin substrate and hence, improve the abrasion resistance and solvent resistance of the polycarbonate resin shaped article.

It has been found that a polymer containing a carboxyl group or carbamoyl group, or a polymer containing both a hydroxyl group and a carboxyl, amino, substituted amino, epoxy or tetrahydrofuryl group is very effective as such a primer layer.

Thus, according to the present invention, there is provided a polycarbonate resin shaped article having a cured coating of a melamine-type resin on its surface through a primer layer resulting from the solidification or curing, in the presence or absence of a crosslinking agent and a crosslinking catalyst, of a primer comprising (A) a polymer containing at least 5 mole% of a recurring structural unit of the following formula

wherein $R_1$ and $R_2$, independently from each other, represent a hydrogen atom or a lower alkyl or carboxyl group, and X represents a side chain containing a carboxyl or carbamoyl group, or (B) a polymer containing at least 2.5 mole% each of a recurring structural unit

wherein $R_1$ and $R_2$ are the same as defined above and Y represents a hydroxyl-containing side chain, and a recurring structural unit of the following formula

wherein $R_3$ and $R_4$, independently from each other, represent a hydrogen atom or a lower alkyl or carboxyl group, and Z represents a side chain containing a group selected from the class consisting of carboxyl, amino, substituted amino, epoxy and tetrahydrofuryl groups.

It is not entirely clear why the polymer (A) or (B) is effective as a primer layer for melamine-type resin paints. But it is believed to be ascribable to the following reason. Functional groups such as a carboxyl or carbamoyl group in polymer (A), or a carboxyl, amino, substituted amino, epoxy or tetrahydrofuryl group in polymer (B) act physically or chemically on the surface of the polycarbonate resin shaped article, and as a result, the primer layer adheres firmly to the surface of the polycarbonate resin shaped article. On the other hand, the carboxyl or carbamoyl group in polymer (A) or the hydroxyl, carboxyl or amino group of polymer (B) is bonded chemically to the functional group, such as methylol, of the melamine resin paint, and as a result, the primer layer adheres firmly to the melamine resin coating. Thus, the polycarbonate resin substrate and the melamine resin coating adhere firmly to each other through a layer of polymer (A) or (B). This consequently affords a polycarbonate resin shaped article having a coating of the melamine-type resin adhered firmly to the surface of the polycarbonate resin article.

The polymer (A) used in this invention may be a homo- or co-polymer which contains at least 5 mole%, preferably 10 to 100 mole%, most preferably 20 to 100 mole%, of a recurring structural unit of the following formula in the molecules

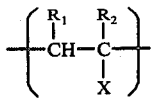

wherein $R_1$ and $R_2$, independently from each other, represent a hydrogen atom or a lower alkyl or carboxyl group, and X represents a side chain containing a carboxyl or carbamoyl group.

The "lower alkyl group" in formula (I) may be either a straight-chain alkyl group or a branched-chain alkyl group, and includes, for example, methyl, ethyl, n- or iso-propyl, or n-, iso-, sec- or tert-butyl. Of these, methyl is especially preferred. The carboxyl- or carbamoyl-containing side chain may be any carboxyl- or carbamoyl-containing side chain usually present in linear high-molecular-weight polymers. For example, it may be a carboxyl group (—COOH) or carbamoyl (—CONH$_2$) itself, or the group —$R_6$—COOH or $R_6$—CONH$_2$ in which $R_6$ is a lower alkylene group such as a methylene or ethylene group.

Preferred species of the polymer (A) are therefore of the type containing at least 5 mole%, preferably 10 to 100 mole%, most preferably 20 to 100 mole%, of a recurring structural unit of the following formula

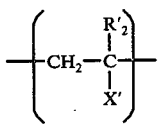

wherein $R'_2$ represents a hydrogen atom or a methyl group, and X' represents a carboxyl or carbamoyl group.

Polymers having the recurring structural units (I) or (I-a) can be easily produced by polymerizing a vinyl monomer of the following formula

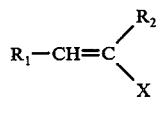

or

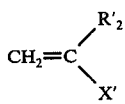

wherein $R_1$, $R_2$, X, $R'_2$ and X' are the same as defined above,
either alone or together with another monomer copolymerizable therewith.

Examples of vinyl monomers of formula (IV) or (IV-a) that can be used in this invention include acrylic acid, methacrylic acid, crotonic acid, vinylacetic acid, maleic acid, itaconic acid, acrylamide, methacrylamide and crotonamide. These vinyl monomers may be used alone or in admixture of two or more.

The other copolymerizable monomer may be any compound which contains at least one ethylenic unsaturation in the molecule. Examples of the comonomer are olefins such as ethylene or propylene; diolefins such as butadiene or isoprene; vinyl compounds such as vinyl chloride, vinylidene chloride, vinyl acetate or acrylonitrile; acrylic or methacrylic acid esters such as methyl acrylate, ethyl acrylate, butyl acrylate, octyl acrylate, methyl methacrylate, ethyl methacrylate, butyl methacrylate, dimethylaminomethyl methacrylate or diethylaminoethyl methacrylate; and acrylamides or methacrylamides such as N,N-diemethyl acrylamide, N,N-diethyl acrylamide, N,N-dimethyl methacrylamide, N,N-diethyl methacrylamide, N-methoxymethyl acrylamide or N-ethoxymethyl methacrylamide. These monomers can be used either alone or in admixture of two or more.

When polymer (A) is a copolymer, it is advantageous to use the monomer of formula (IV) or (IV-a) in an amount of up to 95 mole%, preferably up to 90 mole%, more preferably 20 to 80 mole%, based on the total amount of the monomers used.

Polymer (B) used in this invention contains at least 2.5 mole%, preferably 5 to 95 mole%, more preferably 10 to 90 mole%, each of the following recurring structural units

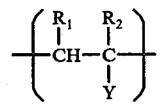

wherein $R_1$ and $R_2$ are the same as defined above, and Y represents a hydroxyl-containing side chain, and

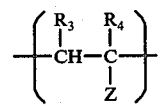

wherein $R_3$ and $R_4$, independently from each other, represent a hydrogen atom or a lower alkyl or carboxyl group, and Z represents a side chain containing a group selected from the class consisting of carboxyl, amino, substituted amino, epoxy and tetrahydrofuryl groups.

The polymer (B) may consist solely of the recurring units of formulae (II) and (III), or further contain another recurring structural unit.

The "hydroxyl-containing side chain" in formula (II) may be any hydroxyl-containing side chain usually present in conventional linear high-molecular-weight polymers, and includes, for example, a hydroxyl group (—OH) itself or the group —$R_7$—OH in which $R_7$ represents a hydrocarbon chain, especially a lower alkylene group, the group

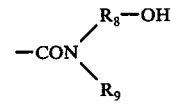

in which $R_8$ represents an alkylene group and $R_9$ represents the group —$R_8$—OH or an alkyl group, or the group —COO—Y' in which Y' represents a hydroxyl-containing ester residue. Suitable hydroxyl-containing ester residues (Y') are the group —$R_{10}$—OH in which $R_{10}$ represents a hydrocarbon chain, especially an alkyl group containing 1 to 4 carbon atoms optionally substituted by at least one hydroxyl group or a polyoxyalkylene group, or the group

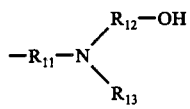

in which $R_{11}$ and $R_{12}$ each represent an alkylene group, especially an alkylene group containing 1 to 4 carbon atoms, and $R_{13}$ represents the group $—R_{12}—OH$ or an alkyl group.

In formula (III), $R_3$ and $R_4$ are the same as defined hereinabove, and group Z may be any side chain containing a carboxyl, amino, substituted amino, epoxy or tetrahydrofuryl group. Examples of the carboxyl- or amino-containing side chain are the same as those given with regard to polymer (A). Especially preferred species of the substituted amino-containing side chain are those of the formula

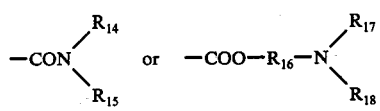

wherein one of $R_{14}$ and $R_{15}$, or one of $R_{17}$ and $R_{18}$, represents a hydrogen atom or a hydrocarbon group, especially an alkyl, alkoxyalkyl or cycloalkyl group and the other represents a hydrocarbon group, especially an alkyl, alkoxyalkyl or cycloalkyl group, or $R_{14}$ and $R_{15}$ together, or $R_{17}$ and $R_{18}$ together, may form a nitrogen-containing heterocyclic ring together with the nitrogen atom; and $R_{16}$ represents a hydrocarbon group, especially an alkylene group.

Examples of the epoxy-containing side chain are

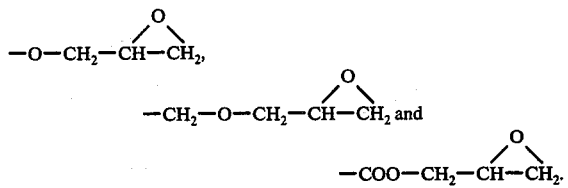

A typical example of the tetrahydrofuryl-containing group is a tetrahydrofurfuryl group

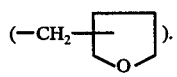

Preferred species of the polymer (B) are those which contain at least 2.5 mole%, preferably 5 to 95 mole%, more preferably 10 to 90 mole%, each of a recurring structural unit of the formula

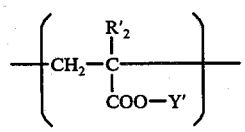

wherein $R'_2$ represents a hydrogen atom or a methyl group and Y' represents a hydroxyl-containing ester residue,
and a recurring structural unit of the formula

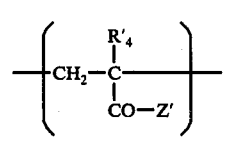

wherein $R'_4$ represents a hydrogen atom or a methyl group, and Z' represents an amino group, a mono- or di-lower alkyl-amino group, or a mono- or di-lower alkoxyalkylamino group, or the group $OR_5$ in which $R_5$ represents a hydrogen atom, a mono- or di-(lower alkyl)aminoalkyl group, a glycidyl group, or a tetrahydrofurfuryl group.

The polymers (B) containing the recurring structural units of formula (II) or (II-a) and (III) or (III-a) can be produced by copolymerizing a vinyl monomer such as a monomer represented by the following formula

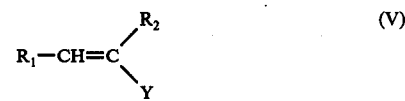

wherein $R_1$, $R_2$ and Y are the same as defined hereinabove, or

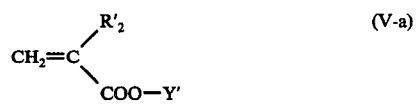

wherein $R'_2$ and Y' are the same as defined hereinabove. and a vinyl monomer of the following formula

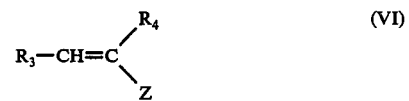

wherein $R_3$, $R_4$ and Z are the same as defined hereinabove, or

wherein $R'_4$ and Z' are the same as defined hereinabove, optionally together with another monomer copolymerizable with these vinyl monomers.

Examples of the vinyl monomers of formula (V) or (V-a) that can be used in this invention are allyl alcohol; N-hydroxymethyl acrylamide, N-hydroxymethyl methacrylamide, N-(2-hydroxyethyl) acrylamide, N,N-dihydroxymethyl acrylamide, and N,N-di(2-hydroxyethyl)amino methacrylamide; 2-hydroxyethyl acrylate, 2-hydroxyethyl methacrylate, 2-hydroxypropyl acrylate, 2-hydroxypropyl methacrylate, 1,4-butylene glycol monoacrylate, 1,4-butylene glycol methacrylate, glycerol monomethacrylate, hydroxyallyl methacrylate, polyethylene glycol monoacrylate, and polypropylene glycol monomethacrylate; and hydroxymethylaminomethyl acrylate, hydroxymethlaminomethyl methacrylate, 2-hydroxyethylaminomethyl acrylate, 2-(2'-hydroxyethylamino)ethyl methacrylate, N,N-di(hydroxymethyl)aminomethyl acrylate, N,N-di(hydroxymethyl)aminomethyl methacrylate and N,N-di(2-hydroxyethyl)aminomethyl acrylate. These vinyl monomers are used either alone or in admixture of two or more.

On the other hand, examples of the vinyl monomers of formula (VI) or (VI-a) that can be used in the present invention include acrylic acid, methacrylic acid, crotonic acid, vinylacetic acid, maleic acid and itaconic acid; acrylamide, methacrylamide and crotonamide; N-methyl acrylamide, N-methyl methacrylamide, N-ethyl acrylamide, N-ethyl methacrylamide, N-propyl acrylamide, N-butyl acrylamide, N-tert-butyl methacrylamide, N,N-dimethylacrylamide, N,N-dimethyl methacrylamide, N,N-diethylacrylamide, N,N-diethyl methacrylamide,N,N-dipropylmethacrylamide, N,N-dibutyl acrylamide, N,N-dibutylmethacrylamide, N-butoxymethyl acrylamide, and N-iso-butoxymethyl methacrylamide; 2-(N-methylamino)ethyl acrylate, 2-(diethylamino)ethyl methacrylate, 2-(N,N-dimethylamino)ethyl acrylate, 2-(N,N-dimethylamino)ethyl methacrylate, 2-(N,N-diethylamino-ethyl) acrylate, 2-(N,N-diethylaminoethyl) methacrylate, 2-(N,N-dibutylamino)ethyl acrylate, 2-(N,N-dibutylamino) ethyl methacrylate, 3-(N,N-diethylamino)propyl acrylate, 3-(N,N-diethylamino)propyl methacrylate, 2-(N,N-dibutylamino) propyl methacrylate, and 3-(N,N-dibutylamino)propyl methacrylate; acryloyl glycidyl ether, allyl glycidyl ether, glycidyl acrylate, glycidyl methacrylate, and glycidyl crotonate; and tetrahydrofurfuryl acrylate, and tetrahydrofurfuryl methacrylate. These vinyl monomers can be used either alone or in combination of two or more.

The other monomer copolymerizable with these vinyl monomers can be chosen from the monomers exemplified hereinabove with regard to polymer (A). When the other monomer is used, it is advantageous to use the vinyl monomer of formula (V) or (V-a) in an amount of at least 2.5 mole%, preferably 5 to 95 mole%, more preferably 10 to 90 mole%, based on the total weight of the monomers used, and the vinyl monomers of formula (VI) or (VI-a) in an amount of at least 2.5 mole%, preferably 5 to 95 mole%, or more preferably 10 to 90 mole%, based on the total weight of the monomers used.

The polymerization of the vinyl monomer of formula (IV) or (IV-a) or the copolymerization of the vinyl monomer of formula (V) or (V-a) with the vinyl monomer of formula (VI) or (VI-a) can be performed by methods known per se such as emulsion, solution, bulk and suspension polymerization methods. Such polymerization methods are described in detail, for example, in D. Braun, H. Cherdron and W. Kern, "Praktikum der Makromolekularen Organischen Chemie", Dr. Alfred Huthig Verlag (1966), and W. R. Sorenson and T. W. Campbell, "Preparative Methods of Polymer Chemistry", John Wiley and Sons Inc. (1960). These references have been cited in lieu of describing the method of preparing polymers (A) or (B) used in this invention.

Polymerization initiating catalysts, such as azobisisobutyronitrile, ammonium peroxide, ammonium persulfate, benzol peroxide, methyl peroxide, ethyl peroxide, cumene hydroperoxide or tert-butyl peroxide, can be used advantageously in the preparation of the polymer (A) or (B) in accordance with the present invention. Desirably, the polymerization is carried out in an atmosphere of an inert gas.

The molecular weight of the polymer (A) or (B) is not critical, but generally, it is desirable for such a polymer to have an average molecular weight of 5,000 to 50,000, preferably 20,000 to 40,000. It is not necessary however that the polymer (A) or (B) be a completely polymerized polymer, but it may be in the form of a prepolymer.

Generally, the polymer (B) exhibits better adhesion to the polycarbonate resin substrate and the melamine-type resin than the polymer (A), and therefore, the polymer (B) would be preferred for the object of the present invention.

In preparing the polycarbonate resin shaped article of this invention, a primer coating composition is first formulated.

Basically, the primer coating composition includes the polymer (A) or polymer (B) as a coat-forming component.

The primer coating composition used in the present invention can substantially comprise only the polymer (A) or (B) and is not always required to contain a crosslinking agent. Preferably, however, the primer coating composition contains a crosslinking agent in order to inhibit the corrosion of a top coating of the melamine resins because the organic solvent in the top coating is likely to corrode the primer coat layer to reduce the adhesion of the top coating.

Thus, a primer coating composition that can be conveniently used in the present invention consists of (i) the polymer (A) or (B), (ii) a crosslinking agent, and (iii) a crosslinking catalyst.

Examples of the crosslinking agent are alkylene glycol dimethacrylates (e.g., ethylene glycol dimethacrylate, or propylene glycol dimethacrylate), alkylene glycol diacrylates (e.g., ethylene glycol diacrylate, or propylene glycol diacrylate), divinylbenzene, divinyltoluene, triallyl melamine, alkyl-etherified methylol melamines (e.g., hexamethoxymethyl melamine, hexaethoxymethyl melamine, or hexabutoxymethyl melamine), N,N'-alkylenebis-acrylamides (e.g., N,N'-methylenebis-acrylamide, or N,N'-ethylenebisacrylamide), N,N'-alkylenebis-methacrylamides (e.g., N,N'-methylenebis-methacrylamide), glycerin trimethacrylate, diallyl maleate, divinyl ether, diallyl monoethylene glycol citrate, allylvinyl maleate, alkylene glycol vinylallyl citrates (e.g., ethylene glycol vinylallyl citrate), diallyl itaconate, alkylene glycol diitaconates (e.g., ethylene glycol diitaconate), divinyl sulfone, hexahydro-1,3,5-triacryloyltriazine, triallyl phosphite, a diallyl ester of benzensulfonic acid, a polyester derived from maleic anhydride and triethylene glycol, polyalkylene glycol diacrylates (e.g., diethylene glycol diacrylate), polyalkylene glycol dimethacrylates (e.g., diethylene glycol dimethacrylate), polyallyl sucrose, polyallyl glucose, sucrose diacrylate, glucose dimethacrylate, pentaerythritol diacrylate, and sorbitol dimethacrylate. Of these, hexamethoxymethyl melamine and hexabutoxymethyl melamine are especially preferred. These crosslinking agents may be used alone or in admixture of two or more. The amount of the crosslinking agent is not critical, but generally, it is 0.05 to 0.7 equivalent, preferably 0.2 to 0.4 equivalent, per equivalent of the functional group (carboxyl, carbamoyl amino, substituted amino, hydroxyl, epoxy, or tetrahydrofuryl) in the polymer (A) or (B).

Examples of the crosslinking catalyst that can be used together with the crosslinking agent are acid catalysts, such as hydrochloric acid, ammonium chloride, ammonium nitrate, ammonium thiocyanate, ammonium carbonate, methylamine hydrochloride, ethylamine hydrochloride, aniline hydrochloride, N,N-dimethylaniline, ammonium sulfide, and ammonium primary phosphate. There is no particular restriction on the amount of the crosslinking catalyst, but the amount can be varied over a wide range according, for example, to the type of the polymer (A) or (B) used, and the type and amount of the crosslinking agent. Generally, the suitable amount of the catalyst is 0.05 to 0.8 equivalent per equivalent of the crosslinking agent used.

In use, the primer coating composition of this invention is diluted to a concentration suitable for coating. Suitable diluents used for this purpose include, for example, alcohols such as methanol, ethanol, propanol, isopropanol or n-butanol; ethers such as methyl cellosolve (i.e., ethylene glycol monomethyl ether), ethyl cellosolve (i.e., ethylene glycol monoethyl ether), or butyl cellosolve (i.e., ethylene glycol monobutyl ether), or methyl cellosolve acetate (i.e., ethylene glycol monomethyl ether acetate); ketones such as methyl ethyl ketone or methyl propyl ketone; and esters such as methyl acetate, ethyl acetate, propyl acetate, isopropyl acetate or butyl acetate. These diluents can be used either alone or in admixture of two or more.

The degree of dilution can be varied over a wide range according, for example, to the coating means employed. Generally, it is desirably such that the concentration of the polymer (A) or (B) is 0.1 to 10% by weight, more preferably 0.5 to 5% by weight, based on the weight of the diluted composition.

If desired, the primer coating composition may contain small amounts of conventional paint additives, such as a flow controlling agent (e.g., "FC-430" and "FC-431" made by Minnesota Mining and Manufacturing Co.; "Synocryl 811-S" made by Cray-Valley Products Limited; "SF 69" made by General Electric Co.; "Modaflow" made by Monsanto Company; and DC#6 made by Dow Corning Corporation).

The primer coating composition can be prepared by dissolving or dispersing the polymer (A) or (B) in the diluent together, if desired, with the crosslinking agent, crosslinking catalyst and other additives.

The primer coating composition so prepared is applied to the surface of a polycarbonate resin shaped article to be treated. The coating can be carried out by any desired methods known per se, such as an immersion method, a spray method, a roller coating method, or a flow coating method.

The thickness of the primer layer is not strict, but if it is too small, sufficient adhesion cannot be obtained. On the other hand, when it is too thick, the primer layer tends to break inside when an external force acts on the top coating. Since this results in reduced adhesion strength, the thickness of the primer layer should be adjusted usually to 0.1 to 3 microns, preferably to 0.5 to 1.0 micron.

The primer layer so applied can be used for a subsequent top coating step after merely drying it. However, when it contains a crosslinking agent and a crosslinking catalyst, it is desirable to bake the primer layer before top coating. The baking temperature differs according to the chemical composition of the primer coating composition, but generally, temperatures of at least 50° C are desirably used. The upper limit of the baking temperature is a temperature below the heat distortion temperature (usually at least 130° C) of the polycarbonate resin shaped article. Preferably, the baking of the primer layer is carried out at a temperature from 100° C. to a point below the heat distortion temperature of the polycarbonate resin shaped article.

Baking ends usually in 10 to 100 minutes although the time differs according, for example, to the type of the polymer used, and the type and amount of the crosslinking agent. The baking step can be carried out in an ordinary heating oven such as hot air oven, infrared heating oven, or far-infrared heating oven.

According to another embodiment of this invention, the primer coating layer can be formed by using a primer coating composition consisting of (a) a vinyl monomer of formula (IV) or (IV-a), or a mixture of a vinyl monomer of formula (V) or (V-A) and a vinyl monomer of formula (VI) or (VI-a), or a mixture of such a monomer or monomeric mixture and another copolymerizable monomer of the type described hereinabove, and (b) a polymerization initiator of the type described hereinabove, and if desired, (c) a crosslinking agent of the described type and (d) a crosslinking catalyst of the described type. In this case, the components (a) to (d) are mixed in the proportions described above, and the mixture is dissolved or dispersed in the diluent. The resulting solution or dispersion is coated on the surface of a polycarbonate resin shaped article, and dried, and if desired (especially when the crosslinking agent is used), baked in the manner mentioned above. Desirably, the drying and baking are carried out in an atmosphere of an inert gas.

This baking induces polymerization and crosslinking simultaneously to form the primer coating layer.

This embodiment, however, is not free from disadvantages such as the necessity of treatment in an atmosphere of an inert gas, and cannot be a commercially preferred method.

A melamine-type resin paint is then coated on the surface of the primer coating layer so formed.

The melamine-type resin paints used in the present invention may be commercially available paints containing an alkyl-etherified methylol melamine as a principal ingredient, for example, a self-condensed melamine-type paint comprising an alkyl-etherified methylol melamine and hydrochloric acid or di- or trimethylol melamine hydrochloride as catalyst (for example, "Delacoat SC" made by Asahi Chemical Co., Ltd.; and "LS-123" made by Bee Chemical Corporation).

An especially preferred melamine-resin type paint used in this invention is of the type disclosed in German Offenlegungsschrift No. 2417915, that is, a surface-hardening coating composition comprising as a hardening component a mixture consisting of (1) methylol melamine wherein at least some of the methylol groups are optionally alkyl-etherified and (2) 0.1 to 1.5 equivalents, especially 0.8 to 1.2 equivalents, per equivalent of the methylol melamine, of an alipahtic or alicyclic compound containing at least two functional groups capable of reacting with the methylol groups or alkyl ethers thereof, and/or a pre-condensation product formed between components (1) and (2).

The number of methylol substituents in the methylal melamine used in the hardening composition can be varied according to the desired degrees of the hardness and flexibility of the resulting coated layer, but is generally 3 to 6, preferably 5 to 6.

The methylol groups may be alkyl-etherified. There is no need to alkyl-etherify all of the methylol substituents, but methylal melamine compounds in which some of the existing methylol groups are alkyl-etherified can also be used in this invention. The degree of alkyletherification differs according to the type of the aliphatic or alicyclic compound to be used as component (2), but in order to avoid the self-condensation of methylal melamine before use, it is preferred to alkyl-etherify all or a greater part of the existing methylol groups.

The alkyl moiety of the alkyl-etherified methylol may contain 1 to 6 carbon atoms, preferably 1 to 3 carbon atoms, and may be of straight chain or branched chain. Examples of the alkyl moiety are methyl, ethyl, n- or iso-propyl, and n-, iso-, or tert.-butyl groups.

Typical examples of methylal melamine that are optionally alkyl-etherified are trimethylolmelamine, tetramethylolmelamine, pentamethylolmelamine, hexamethylolmelamine, pentamethylolmelamine tributyl ether, hexamethylolmelamine triethyl ether, tetramethylolmelamine tetramethyl ether, and hexakismethoxymethylmelamine.

In the aliphatic or alicyclic compound containing at least two functional groups, the functional groups may be any groups which have the property of reacting with the methylol groups or alkyl ethers thereof of component (2), and preferably include hydroxyl, amino and carboxyl groups.

Preferred aliphatic or alycyclic compounds are polyols such as ethylene glycol, diethylene glycol, triethylene glycol, propylene glycol, 1,3-or 1,2-propanediol, 1,2-, 1,3-, 1,4-, or 2,3-butanediol, 1,2- or 1,8-octanediol sorbitol, polyethylene glycol, polypropylene glycol, ethylene glycol/propylene glycol copolymer, glycerol, digitoxose, and phloroglucitol. Of these, diols of the formula $HO(CH_2)_nOH$ in which $n$ is an integer of 3 to 8 are especially preferred. Other usuable aliphatic or alicyclic compounds are described in the above-cited German Offenlegungsschrift.

The pre-condensation product is desirably soluble in the diluent used, that is, solvent-soluble, and has a molecular molecular weight of 500 to 100,000.

The surface-hardening coating composition described above is mixed before use with a catalyst and the diluent exemplified above with regard to the primer coating composition to form a top coating composition having a viscosity suitable for coating. The catalyst may be any compounds which are known as a curing promotor for melamine resins. Suitable catalysts include organic or inorganic acids or ammonium or amine salts thereof, or bases or carbonates thereof. For example, there can be effectively used p-toluenesulfonic acid, nitric acid, hydrochloric acid, ammonium chloride, ammonium p-toluenesulfonate, methylamine hydrochloride, sodium hydroxide, and sodium carbonate. In order to promote the curing reaction further, a promotor such as water may be incorporated as required. If further desired, an additive such as pigment or surface conditioner may be added in a small amount.

The surface-hardening coating composition is then applied by an ordinary coating method such as immersion, spraying, roller coating, or flow coating to the pre-treated surface.

The thickness of the coating layer is not critical, but it is advantageous to adjust it so that the thickness of the top coating layer after baking (hardening) is usually 3 to 50 microns, preferably 5 to 20 microns.

After application, the coated layer is baked. The baking temperature differs according to the type of the coating composition used. Generally, it is effective to cure the coating by heating at a temperature of at least 60° C. The upper limit of the baking temperature is a point below the heat distortion temperature of the polycarbonate resin shaped article.

Baking can generally be carried out in a heating oven, and conveniently, the coated articel is heated at 100° to 130° C for 20 minutes to 5 hours to cure the top coating layer.

Instead of baking the primer coating and the top coating separately, a method can also be used which comprises drying the applied primer coating at room temperature or a temperature near room temperature to remove the diluent, applying the melamine-type resin top coating composition on the primer layer, and heat-treating the coated article to bake and cure the primer layer and the top coating at the same time.

Thus, according to the present invention, there is provided a polycarbonate resin shaped article consisting of a polycarbonate resin shaped article and a cured coating of the melamine type resin having superior abrasion resistance and solvent resistance bonded firmly onto the surface of the shaped article through the primer layer.

Examples of the polycarbonate resin that can be used in the present invention are 4,4'-isopropylidene diphenol polycarbonate, and other polycarbonates and diethylene glycol bis allyl carbonate which are disclosed, for example, in U.S. Pat. No. 3,305,520, and W. F. Christopher and D. W. Fox, "Polycarbonate", pages 161 to 176 (1962).

The polycarbonate resin shaped articles having improved abrasion resistance, solvent resistance and durability provided by the present invention find a wide range of applications, for example, as various protective items such as lenses for sunglasses, lenses for industrial protective eyeglasses and face shields, various windshield plates in aeroplanes, helicopters, motor boats, snowmobiles, autobicycles and automobiles, glazings in schools, factories, warehouses, churches, stores, gymnasiums and other buildings, instrument plates, and dust covers.

The following Examples illustrate the present invention in greater detail.

EXAMPLE 1

A three-necked flask equipped with a stirrer, a thermometer and a nitrogen introducing tube was purged and filled with nitrogen, and then charged with 320 g of ethyl cellosolve, 36 g (50 mole%) of 2-hydroxyethyl methacrylate, 44 g (50 mole%) of dimethylaminoethyl methacrylate and 0.4 g of azobisisobutyronitrile. With gentle stirring, the temperature of the inside of the flask was raised to 90° C. During this time, nitrogen was incessantly introduced into the flask, and the reaction was continued for about 4 hours. The mixture inside the flask became a clear pale yellow liquid having a viscosity of about 100 centipoises, which was a copolymer of 2-hydroxyethyl methacrylate and dimethylaminoethyl methacrylate having an average molecular weight of about 30,000. A primer coating composition was prepared by mxing 100 g of this liquid copolymer, 0.4 g of hexamethoxymethyl melamine, 0.057 g of ammonium chloride, 900 g of ethyl cellosolve and a small amount of a flow controlling agent, and coated by an immersion method on a 2 mm-thick polycarbonate plate which had been cleaned. The coated plate was heat-treated in a heating oven at 130° C for 20 minutes to bake and cure the primer coating.

65 g of hexakis-methoxymethylol melamine was reacted with 50.5 g of 1,4-butanediol to form a prepolymer having a molecular weight of about 5,000. One gram of ethylene glycol was added to 100 g of the prepolymer. The mixture was dissolved in 40 g of ethyl cellosolve, and 3 g of p-toluenesulfonic acid was added as a catalyst to form a melamine resin paint. The resulting paint was coated on the primer coating, and baked at 120° C for 40 minutes to afford a coating having good abrasion resistance, adhesion and weatherability, as shown in Table 1.

Table 1 shows the pencil hardness (Japanese Industrial Standards, JIS K-5400), adhesion, thermal shock resistance, weatherability, water resistance and solvent resistance of the resulting polycarbonate plate in comparison with those of an uncoated polycarbonate plate and a polycarbonate plate coated only with the top coating.

The "adhesion" is determined by a crosscut tape test in the following manner. Eleven parallel lines are provided by a knife both longitudinally and transversely on the surface of a specimen at intervals of 1 mm to form 100 squares. An adhesive tape is applied to the crosscut surface of the specimen, and then pulled off. The number of squares that have been peeled off is counted, and represents the "adhesion".

The "thermal shock resistance" is determined by subjecting the specimen to a cycle consisting of maintaining it at −30° C for 16 hours and then at 80° C for 8 hours. The number of such cycles required until the coating or the surface of the specimen is peeled is measured, and represents the "thermal shock resistance".

The "weatherability" represents the time that elapses until a change occurs in the coating or surface of the specimen exposed to a weather-O-meter (Standard Weather Meter, WE, SH, 2CS type, a product of Toyo Rikagaku Kogyo K.K.).

The "water resistance" represents the presence or absence of a change on the surface of the specimen after it has been boiled for 3 hours in water.

The "solvent resistance" represents the time that elapses unitl a change occurs on the surface or coating of the specimen when it is immersed in a solvent.

Table 1

| Properties | Uncoated polycarbonate plate | Coated polycarbonate plate without primer | Coated polycarbonate plate with primer |
|---|---|---|---|
| Pencil hardness | H | 5H | 5H |
| Adhesion | — | 100 | 100 |
| Thermal shock resistance (cycles) | more than 30 | 3 | more than 30 |
| Weatherability (hours) | more than 1000 | 200 | more than 1000 |
| Water resistance | No change | Peeled all over | No change |
| Resistance to 10% sodium hydroxide | more than 18 | more than 18 | more than 18 |
| Resistance to 10% ammonia water (days) | 1 | 3 | more than 18 |
| Resistance to 10% hydrochloric acid (days) | 3 | 3 | 9 |
| Resistance to 10% sulfuric acid (days) | more than 18 | 18 | 18 |
| Resistance to 5% methanol (days) | 3 | 10 | more than 18 |
| Resistance to 50% ethanol (days) | 18 | 18 | more than 18 |
| Resistance to 100% toluene (minutes) | 10 | 10 | 30 |

EXAMPLE 2

In a similar way to Example 1, a flask was charged with 320 g of ethyl cellosolve, 51.5 g (50 mole%) of 2-hydroxyethyl methacrylate, 28.5 g (50 mole%) of acrylic acid and 0.4 g of azobisisobutyronitrile. With stirring, the temperature of the inside of the flask was raised to 90° C in an atmosphere of nitrogen. The reaction was continued for 4 hours. The mixture inside the flask reacted and became a transparent liquid having a viscosity of about 100 centipoises, which was a copolymer of 2-hydroxyethyl methacrylate and acrylic acid having an average molecular weight of 30,000. A primer coating composition was prepared by diluting 100 g of the resulting liquid with 0.6 g of hexamethoxymethyl melamine, 0.08 g of ammonium chloride and 900 g of ethyl cellosolve and adding a small amount of a flow controlling agent. The resulting primer coating composition was applied by an immersion method to a 2 mm-thick polycarbonate plate which had been cleaned. The coated plate was heat-treated 130° C for 50 minutes in a heating oven to bake and cure the coating.

A plastic surface-hardening coating composition prepared in the same way as in Example 1 by reacting hexamethoxymethyl melamine and 1,4-butanediol was coated by an immersion method on the primer coating. The coated plate was heat-treated at 130° C for 2 hours to bake the coating. The resulting coating had good abrasion resistance, adhesion and weatherability.

EXAMPLE 3

In the same way as in Example 1, 320 g of ethyl cellosolve, 38 g (50 mole%) of 2-hydroxyethyl methacrylate, 42 g of (50 mole%) of glycidyl methacrylate and 0.4 g of azobisisobutyronitrile were charged into a three-necked flask, and the temperature of the inside of the flask was raised to 80° C in an atmosphere of nitrogen. The mixture was stirred at this temperature for 4 hours. The mixture in the flask reacted and became a transparent liquid having a viscosity of 100 centipoises which was a copolymer of 2-hydroxyethyl methacrylate and glycidyl methacrylate having an average molecular weight of 30,000.

100 g of the resulting liquid was withdrawn from the flask and mixed with 0.43 g of hexamethoxymethyl melamine and 0.06 g of ammonium chloride as a catalyst, and the mixture was diluted with 900 g of ethyl cellosolve. A small amount of a flow controlling agent was added to form a primer coating composition. The coating composition was applied by an immersion method to a 2 mm-thick polycarbonate plate cleaned in advance, and baked and cured by heat-treatment at 130° C for 50 minutes in a heating oven.

A plastic surface-hardening coating composition obtained by reacting hexamethoxymethyl melamine with 1,4-butanediol was applied to the primer coating layer, and baked at 120° C for 40 minutes to afford a coating having good abrasion resistance, adhesion, and weatherability.

EXAMPLE 4

In the same way as in Example 1, a three-necked flask was charged with 220 g of ethyl cellosolve, 100 g of water, 51.7 g (50 mole%) of 2-hydroxyethyl methacrylate, 28.3 g (50 mole%) of acrylamide, and 0.4 g of azobisisobutyronitrile. The temperature was raised to 80° C in an atmosphere of nitrogen, and at this temperature, the mixture was stirred for 6 hours. The mixture in the flask reacted and became a milk-white liquid having a viscosity of 240 centipoises which was a copolymer of 2-hydroxyethyl methacrylate and acrylamide having an average molecular weight of 40,000.

100 g of the resulting liquid was withdrawn from the flask, and 0.58 g of methoxymethyl melamine and 0.08 g of ammonium chloride as a catalyst were added. The mixture was diluted with 675 g of ethyl cellosolve and 225 g of water, and a small amount of a flow controlling agent was added. The resulting primer coating composition was applied by an immersion method to a 2mm-thick polycarbonate plate cleaned in advance, and heat-treated at 130° C. for 50 minutes in a heating oven to bake and cure the coating.

A plastic surface-hardening coating composition obtained by reacting 65 g of hexamethylolmelamine with 150 g of 1,4-butanediol was similarly applied to the primer coating layer, and baked at 120° C for 2 hours to afford a coating having good abrasion resistance, adhesion and weatherability.

EXAMPLE 5

In the same way as in Example 1, a three-necked flask was charged with 320 g of ethyl cellosolve, 45 g (50 mole%) of 2-hydroxyethyl methacrylate, 35 g (50 mole%) of N-methylol acrylamide, and 0.4 of azobisobutyronitrile, and in an atmosphere of nitrogen, the temperature of the inside of the flask was raised to 80° C. At this temperature, the mixture was stirred for 6 hours. The mixture inside the flask reacted and became a milk-white non-transparent liquid having a viscosity of 250 centipoises which was a copolymer of 2-hydroxyethyl methacrylate and N-methylol acrylamide having an average molecular weight of 40,000.

100 g of the liquid was withdrawn from the flask, and mixed with 0.51 g of methoxymethyl melamine, 0.07 g of ammonium chloride as a catalyst, 900 g of ethyl cellosolve as a diluent, and a small amount of a flow controlling agent. The resulting primer coating composition was applied by an immersion method to a 2mm-thick polycarbonate plate cleaned in advance, and heat-treated at 130° C for 50 minutes in a heating oven to bake and cure the coating.

A plastic surface-hardening coating composition obtained by reacting 65 g of hexamethylolmelamine with 150 g of 1,4-butanediol was similarly applied to the primer coating layer, and baked at 130° C for 2 hours to afford a coating having good abrasion resistance, adhesion and weatherability.

EXAMPLE 6

In the same way as in Example 1, a three-necked flask was charged with 50 g of acrylamide, 200 g of water, and 0.50 g of ammonium persulfate, and with gentle stirring, the temperature of the inside of the flask was raised to 80° C. The mixture was stirred at this temperature for 2 hours. The mixture inside the flask reacted and became a transparent liquid having a viscosity of about 200 centipoises which was a polymer of acrylamide having an average molecular weight of 40,000.

100 g of the liquid was withdrawn from the flask, and mixed with 2.0 g of hexamethoxymethyl melamine, and 0.08 g of ammonium chloride as a catalyst. The mixture was diluted with 300 g of ethyl cellosolve and 600 g of water, and a small amount of a flow controlling agent was added. The resulting primer coating composition was applied by an immersion method to a 2 mm-thick polycarbonate plate cleaned in advance, and heat-treated at 130° C for 50 minutes in a heating oven to bake and cure the coating.

A plastic surface-hardening coating composition consisting of a modified melamine having self-condensability, such as trimethylolmelamine or trimethoxymethyl-methyl melamine, and a suitable catalyst was applied to the primer coating layer, and baked at 120° C for 40 minutes. Using the resulting product, the same tests as in Example 1 were performed, and the results are shown in Table 2. These results demonstrate that the coating obtained had good adhesion and weatherability.

Table 2

| Properties | Uncoated polycarbonate plate | Coated polycarbonate plate without primer | Coated polycarbonate plate with primer |
|---|---|---|---|
| Pencil hardness | H | 5H | 5H |
| Adhesion | — | 100 | 0 |
| Thermal shock resistance (cycles) | more than 30 | 3 | more than 30 |
| Weatherability (hours) | more than 1000 | 200 | more than 1000 |
| Water resistance | No change | Peeled all over | No change |
| Resistance to 10% sodium hydroxide (days) | more than 18 | 6 | 6 |
| Resistance to 10% ammonia water (days) | 1 | 3 | 18 |
| Resistance to 10% hydrochloric acid (days) | 3 | 6 | 6 |
| Resistance to 10% sulfuric acid (days) | more than 18 | 18 | 18 |
| Resistance to 5% methanol (days) | 3 | 10 | 18 |
| Resistance to 50% ethanol (days) | 18 | 18 | more than 18 |
| Resistance to 100% toluene (minutes) | 10 | 10 | 20 |

EXAMPLE 7

In the same way as in Example 1, a three-necked flask was charged with 20 g of acrylic acid, 200 g of water and 0.5 g of ammonium peroxide, and with gentle stirring, the temperature of the inside of the flask was raised to 90° C. The mixture was stirred at this temperature for 2 hours. The mixture in the flask became a transparent liquid having a viscosity of about 100 centipoises which was a polymer of acrylic acid having an average molecular weight of 30,000.

100 g of this liquid was withdrawn from the flask, and mixed with 1.0 g of hexamethoxymethyl melamine, and 0.05 g of ammonium chloride. The mixture was diluted with 150 g of ethyl cellosolve and 300 g of water, and a small amount of a flow controlling agent was added. The resulting primer coating composition was applied by an immersion method to a 2 mm-thick polycarbonate plate, and heat-treated at 130° C for 50 minutes in a heating oven to bake and cure the coating.

A plastic surface-hardening coating composition comprising triethoxymelamine and di- and tri-methylolmelamine hydrochlorides as main ingredients was similarly applied to the primer coating layer, and baked at 120° C for 40 minutes to afford a coating having good abrasion resistance, adhesion and weatherability.

EXAMPLE 8

In the same way as in Example 1, a three-necked flask was charged with 360 g of ethyl cellosolve, 40 g (50 mole%) of 2-hydroxyethyl methacrylate, 52 g (50 mole%) of tetrahydrofurfuryl methacrylate and 0.45 g of azobisisobutyronitrile, and the temperature of the inside of the flask was raised to 80° C in an atmosphere of nitrogen. The mixture was stirred at this temperature for 2 hours. The mixture inside the flask reacted and became a transparent liquid having a viscosity of about 65 centipoises which was a copolymer of 2-hydroxyethyl methacrylate and tetrahydrofurfurylmethacrylate having an average molecular weight of 20,000.

100 g of the liquid was withdrawn from the flask, and mixed with 0.4 g of hexamethoxymethyl melamine and 0.06 g of ammonium chloride as a catalyst. The mixture was diluted with 900 g of ethyl cellosolve, and a small amount of a flow controlling agent was added. The resulting primer coating composition was applied by an immersion method to a 2 mm-thick polycarbonate plate cleaned in advance, and heat-treated at 130° C for 50 minutes to bake and cure the coating.

A plastic surface-hardening coating composition comprising triethoxymelamine and di- and-trimethylolmelamines as main ingredients was similarly applied to the primer coating layer and baked at 120° C for 40 minutes to afford a coating having good abrasion resistance, adhesion and weatherability.

EXAMPLE 9

In the same way as in Example 1, a three-necked flask was charged with 230 g of ethyl cellosolve, 100 g of water, 50 g (51 mole%) of tetrahydrofurfuryl methacrylate, 20 g (49 mole%) of acrylamide and 0.35 g of azobisisobutyronitrile, and with stirring, the temperature of the inside of the flask was raised to 90° C. The stirring was continued at this temperature for 4 hours. The mixture inside the flask reacted, and became a transparent liquid having a viscosity of 100 centipoises which was a copolymer of tetrahydrofurfuryl methacrylate and acrylamide having an average molecular weight of 30,000.

100 g of this liquid was withdrawn from the flask, and mixed with 1.36 g of hexamethoxymethyl melamine and 0.20 g of ammonium chloride as a catalyst. The mixture was diluted with 675 g of ethyl cellosolve and 225 g of water, and a small amount of a flow controlling agent was added. The resulting primer coating composition was applied by an immersion method to a 2 mm-thick polycarbonate plate cleaned in advance, and heat-treated at 130° C for 50 minutes in a heating oven to bake and cure the coating.

A plastic surface-hardening coating composition consisting mainly of triethoxymelamine and di- and tri-methylol melamines was similarly applied to the primer coating layer, and baked at 120° C for 40 minutes to afford a coating having good abrasion resistance, adhesion and weatherability.

EXAMPLE 10

In the same way as in Example 1, a three-necked flask equipped with a stirrer, a thermometer and a nitrogen introducing tube was filled with nitrogen, and then charged with 320 g of ethyl cellosolve, 35.4 g (40 mole%) of 2-hydroxyethyl methacrylate, 10.6 g (10 mole%) of dimethylaminoethyl methacrylate, 34 g (50 mole%) of methyl methacrylate and 0.4 g of azobisisobutyronitrile. With gentle stirring, the temperature of the inside of the flask was raised to 90° C. During this time, nitrogen was incessantly blown into the flask, and the reaction was continued for about 4 hours at this temperature. The mixture inside the flask became a transparent light yellow liquid having a viscosity of about 200 centipoises which was a terpolymer of 2-hydroxyethyl methacrylate, dimethylaminoethyl methacrylate and methyl methacrylate having an average molecular weight of 40,000.

100 g of the liquid was withdrawn from the flask, and mixed with 1.0 g of hexamethoxymethyl melamine, and 0.15 g of ammonium chloride as a catalyst. The mixture was diluted with 1700 g of ethyl cellsolve, and a small amount of a flow controlling agent was added. The resulting primer coating composition was applied by an immersion method to a 2 mm-thick polycarbonate plate cleaned in advance, and heat-treated at 130° C for 20 minutes in a heating oven to bake and cure the coating.

A plastic surface-hardening coating composition obtained by reacting hexamethoxymethyl melamine with 1,4-butanediol was similarly applied to the primer coating layer, and baked at 130° C for 40 minutes to afford a coating having good abrasion resistance, adhesion and weatherability.

What is claimed is:
1. A polycarbonate resin shaped article having a cured coating of a melamine-type resin on its surface through a primer layer resulting from the solidification or curing, in the presence or absence of a crosslinking agent and a crosslinking catalyst, of a primer comprising
(A) a polymer containing at least 5 mole% of a recurring structural unit of the formula

(I)

wherein $R_1$ and $R_2$, independently from each other, represent a hydrogen atom or a lower alkyl or carboxyl group, and X represents a side chain containing a carboxyl or carbamoyl group, or
(B) a polymer containing at least 2.5 mole% each of a recurring structural unit of the formula

(II)

wherein $R_1$ and $R_2$ are the same as defined above and Y represents a hydroxyl-containing side chain,
and a recurring structural unit of the formula

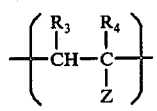
(III)

wherein $R_3$ and $R_4$, independently from each other, represent a hydrogen atom or a lower alkyl or carboxyl group, and Z represents a side chain containing a carboxyl group, an amino group, a substituted amino group, an epoxy group or a tetrahydrofuryl group.

2. The shaped article of claim 1 wherein $R_1$ in formula (I) is hydrogen, $R_2$ in formula (I) is hydrogen or methyl, and X is carboxyl or carbamoyl.

3. The shaped article of claim 1 wherein
$R_1$ in formula (II) is hydrogen,
$R_2$ in formula (II) is hydrogen or methyl,
Y is —COO—Y' where Y' is a hydroxyl-containing ester residue,
$R_3$ is hydrogen,
$R_4$ is hydrogen or methyl, and
Z is —CO—Z' where Z' is amino, mono- or di-lower alkyl-amino, mono- or di-lower alkoxyalkylamino, or the group $OR_5$ in which $R_5$ is hydrogen, mono- or di-(lower alkyl)aminoalkyl, glycidyl, or tetrahydrofurfuryl.

4. The shaped article of claim 1 wherein said polymer (A) contains 10 to 100 mole% of the recurring unit of formula (I).

5. The shaped article of claim 1 wherein said polymer (B) contains 5 to 95 mole% of the recurring structural unit of formula (II) and 95 to 5 mole% of the recurring structural unit of formula (III).

6. The shaped article of claim 1 wherein said crosslinking agent is selected from the group consisting of alkylene glycol dimethacrylates, alkylene glycol diacrylates, divinylbenzene, divinyltoluene, triallyl melamine, alkyl-etherified methylolmelamines, N,N'-alkylenebis-acrylamides, N,N'-alkylenebis-methacrylamides, glycerin trimethacrylate, diallyl maleate, divinyl ether, diallyl monoethylene glycol citrate, allyl vinyl maleate, alkylene glycol vinyl allyl citrates, diallyl itaconate, alkylene glycol diitaconates, divinyl sulfone, hexahydro-1,3,5-triacryloyl triazine, triallyl phosphite, a diallyl ester of benzenesulfonic acid, a polyester derived from maleic anhydride and triethylene glycol, polyalkylene glycol diacrylates, polyalkylene glycol dimethacrylates, polyallyl sucrose, polyallyl glucose, sucrose diacrylate, glucose dimethacrylate, pentaerythritol diacrylate, and sorbitol dimethacrylate.

7. The shaped article of claim 1 wherein said crosslinking agent is present in an amount of 0.05 to 0.7 equivalent per equivalent of the functional groups in said polymer (A) or (B).

8. The shaped article of claim 1 wherein the primer coating layer has a thickness of 0.1 to 3 microns.

9. The shaped article of claim 1 wherein said melamine-type resin comprises as a curable component a mixture consisting of (a) methylolmelamine wherein at least some of the methylol groups are optionally alkyletherified, and (b) 0.1 to 1.5 equivalents, per equivalent of said methylol melamine, of an aliphatic or alicyclic compound containing at least two functional groups capable of reacting with the methylol groups of the methylolmelamine, and/or a precondensation product formed between components (a) and (b).

10. The shaped article of claim 1 wherein said top coating layer has a thickness of 3 to 50 microns.

11. A process for producing a polycarbonate resin shaped article having improved resistance to surface abrasion, which comprises coating the surface of a polycarbonate resin shaped article with a primer coating composition comprising
(A) a polymer containing at least 5 mole% of a recurring structural unit of the formula

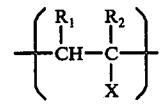
(I)

wherein $R_1$ and $R_2$, independently from each other, represent a hydrogen atom or a lower alkyl or carboxyl group, and X represents a side chain containing a carboxyl or carbamoyl group, or
(B) a polymer containing at least 2.5 mole% each of a recurring structural unit of the formula

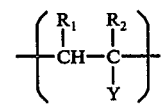
(II)

wherein $R_1$ and $R_2$ are the same as defined above and Y represents a hydroxyl-containing side chain,
and a recurring structural unit of the formula

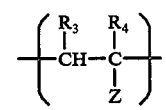
(III)

wherein $R_3$ and $R_4$, independently from each other, represent a hydrogen atom or a lower alkyl or carboxyl group, and Z represents a side chain containing a carboxyl group, an amino group, a substituted amino group, an epoxy group or a tetrahydrofuryl group,
in the presence or absence of a crosslinking agent and a crosslinking catalyst; drying the resulting primer coating layer; coating a melamine-type resin coating composition on the dried primer coating layer; and baking the melamine-type resin coating at a temperature lower than the heat distortion temperature of the resin shaped article.

12. The process of claim 11 which further comprises baking the dried primer coating layer at a temperature lower than the heat distortion temperature of said resin shaped article, before coating the melamine-type resin coating composition on the dried primer coating layer.

13. A process for producing a polycarbonate resin shaped article having improved resistance to surface abrasion, which comprises coating the surface of a polycarbonate resin shaped article with a primer coating composition comprising
(A) a monomeric component containing at least 5 mole%, based on the total monomer weight, of a vinyl monomer of the formula

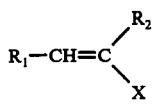

wherein $R_1$ and $R_2$, independently from each other, represents a hydrogen atom or a lower alkyl or carboxyl group, and X represents a side chain containing a carboxyl or carbamoyl group, or a monomeric component containing at least 2.5 mole%, based on the total monomer weight, each of a vinyl monomer of the formula

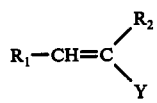

wherein $R_1$ and $R_2$ are the same as defined above, and Y represents a side chain containing a hydroxyl group, and a vinyl monomer of the formula

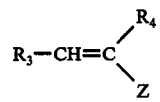

wherein $R_3$ and $R_4$, independently from each other, represents a hydrogen atom or a lower alkyl or carboxyl group, and Z represents a side chain containing a carboxyl, amino, substituted amino, epoxy or tetrahydrofuryl group, and (B) a polymerization initiator, in the presence or absence of a crosslinking agent and a crosslinking catalyst; drying the resulting primer coating layer; coating a melamine-type resin coating composition on the dried primer coating layer; and baking the melamine-type resin coating at a temperature lower than the heat distortion temperature of the resin shaped article.

14. The process of claim 13, which further comprises baking the dried primer coating layer at a temperature lower than the heat distortion temperature of said resin shaped article, before coating the melamine-type resin coating composition on the dried primer coating layer.

* * * * *